United States Patent
Feng et al.

(10) Patent No.: US 8,223,761 B2
(45) Date of Patent: Jul. 17, 2012

(54) METHOD FOR DIAGNOSING THE ROUTER WHICH SUPPORTS POLICY-BASED ROUTING

(75) Inventors: Jian Feng, Guangdong Province (CN); Ke Du, Guangdong Province (CN); Hui He, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 378 days.

(21) Appl. No.: 11/660,891

(22) PCT Filed: Dec. 28, 2004

(86) PCT No.: PCT/CN2004/001543
§ 371 (c)(1), (2), (4) Date: Feb. 22, 2007

(87) PCT Pub. No.: WO2006/069478
PCT Pub. Date: Jul. 6, 2006

(65) Prior Publication Data
US 2007/0248019 A1  Oct. 25, 2007

(51) Int. Cl.
*H04L 12/28* (2006.01)
*H04L 12/56* (2006.01)
(52) U.S. Cl. .................. 370/389; 370/351; 370/352
(58) Field of Classification Search .......... 370/351–356
See application file for complete search history.

(56) References Cited

U.S. PATENT DOCUMENTS

| | | | | |
|---|---|---|---|---|
| 6,119,171 | A * | 9/2000 | Alkhatib | 709/245 |
| 6,327,618 | B1 * | 12/2001 | Ahlstrom et al. | 709/223 |
| 6,603,769 | B1 * | 8/2003 | Thubert et al. | 370/401 |
| 7,079,491 | B2 * | 7/2006 | Nakano et al. | 370/242 |
| 7,088,706 | B2 * | 8/2006 | Zhang et al. | 370/352 |
| 7,454,494 | B1 * | 11/2008 | Hedayat et al. | 709/224 |
| 8,050,180 | B2 * | 11/2011 | Judd | 370/242 |
| 2002/0150041 | A1 * | 10/2002 | Reinshmidt et al. | 370/216 |

FOREIGN PATENT DOCUMENTS

| | | |
|---|---|---|
| JP | 2001251353 A | 9/2001 |
| JP | 2002217976 A | 8/2002 |
| JP | 2002252635 A | 9/2002 |

OTHER PUBLICATIONS

Postel, J., Internet Control Message Protocol, Sep. 1981, RFC 792.*
RFC 791, "Internet Protocol", Sep. 1981.*
RFC 792, "Internet Control Message Protocol", Sep. 1981.*
International Search Report, PCT/CN2004/001543, dated Aug. 18, 2005.

* cited by examiner

*Primary Examiner* — Ayaz Sheikh
*Assistant Examiner* — Blanche Wong

(57) ABSTRACT

A route diagnosis method which supports policy-based routing is applied in the network which includes a router supporting policy-based routing, which comprises: adding stream description information of service stream in diagnosis-protocol-message, and containing a router warning option in IP head of the said diagnosis-protocol-message; based on the router supporting policy-based routing receiving said diagnosis-protocol-message, routing according to said stream description information in the said diagnosis-protocol-message; said diagnosis-protocol-message is processed as standard diagnosis-protocol-message by the router which is independent of policy-based routing. Employing the method of the present invention, the middle router which supports policy-based routing is able to transfer the message independent of IP head of the said diagnosis-protocol-message, but select routing according to said stream description information included in the message, thereby being capable of keeping the consistency between the diagnosis-protocol-message and routing of the service stream. The purpose that is actually diagnosing routing or correctly diagnosing route is achieved.

7 Claims, 3 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |      Code     |           Checksum            |
+-+-+-+-+-+-+-+-+-+-+-+-+-+-+-+-+-+-+-+-+-+-+-+-+-+-+-+-+-+-+-+-+
|                         option data                           |
+-+-+-+-+-+-+-+-+-+-+-+-+-+-+-+-+-+-+-+-+-+-+-+-+-+-+-+-+-+-+-+-+
```

FIG 1

PRIOR ART

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type(8)    |      Code     |           Checksum            |
+-+-+-+-+-+-+-+-+-+-+-+-+-+-+-+-+-+-+-+-+-+-+-+-+-+-+-+-+-+-+-+-+
|           Identifier          |        Sequence Number        |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
```

FIG 2

PRIOR ART

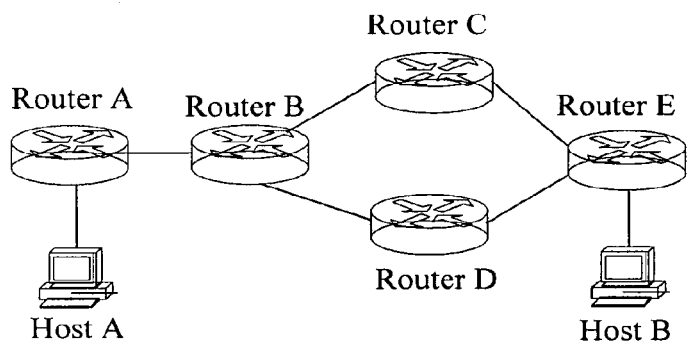

FIG 3

PRIOR ART

```
 0                   1                   2                   3
 0 1 2 3 4 5 6 7 8 9 0 1 2 3 4 5 6 7 8 9 0 1 2 3 4 5 6 7 8 9
0 1
+-+-+-+-+-+-+-+-+-+-+-+-+-+-+-+-+-+-+-+-+-+-+-+-+-+-+-+-+-+-+
|      Type       |       Length        |      Value        |
+-+-+-+-+-+-+-+-+-+-+-+-+-+-+-+-+-+-+-+-+-+-+-+-+-+-+-+-+-+-+
```

FIG 6

```
 0                   1                   2                   3
 0 1 2 3 4 5 6 7 8 9 0 1 2 3 4 5 6 7 8 9 0 1 2 3 4 5 6 7 8 9
0 1
+-+-+-+-+-+-+-+-+-+-+-+-+-+-+-+-+-+-+-+-+-+-+-+-+-+-+-+-+-+-+
|   Type(0x42)    |     Length(1)       |      Value        |
+-+-+-+-+-+-+-+-+-+-+-+-+-+-+-+-+-+-+-+-+-+-+-+-+-+-+-+-+-+-+
```

FIG 7

METHOD FOR DIAGNOSING THE ROUTER WHICH SUPPORTS POLICY-BASED ROUTING

CROSS REFERENCE TO RELATED APPLICATIONS or PRIORITY CLAIM

This application is a national phase of International Application No. PCT/CN2004/001543 entitled "A Method For Diagnosing The Router Which Supports Policy-Based Routing", which was filed on Dec. 28, 2004.

FIELD OF THE INVENTION

The present invention relates to a route diagnosis technique for IP network, and particularly, to a route diagnosis method for IP network which includes a router supporting policy-based routing.

BACKGROUND OF THE INVENTION

In IP (Internet Protocol) network, network diagnosis tools such as ping/trace route are used to diagnose the accessibility of a target network, the routing situation of an IP package, and the position of failure in routing. The message of Internet Control Message Protocol (ICMP) is used to transmit control information between a router and a host, and FIG. 1 shows PDU format of the existed ICMP, comprising type, code, checksum, and option data. A network administrator can use these control information to diagnose route problems in the network.

Two commonly used route diagnosis tools are respectively introduced as follows. One is ping tool, and its processing is as follows: a source website (i.e. a router or a host) sends several ICMP echo messages to a target website, if the target website receives these ICMP echo messages, an ICMP reply message is used to reply them, and the source website diagnoses whether the target website can be accessed and whether the transmission is delayed according to the ICMP reply message; FIG. 2 shows the PDU format of the existed ICMP echo message, wherein, the specific contents of the PDU include identifier, sequence number, and data. The other is trace route tool, and its processing is as follows: a source website sends to a target website an ICMP message or a UDP message whose time to live value (i.e. the TTL value used for calculating how many routers a data package has passed through) increases progressively from 1, and a middle router takes turns to loopback an ICMP timeout message until reaching the target website because TTL is timeout; the target website replies the ICMP reply message or an ICMP port unaccessible message and takes turns to record source addresses of the corresponding messages of the ICMP. The delivery routing of the IP package can be shown by using trace route tool.

However, all the above mentioned diagnosis tools such as ping/trace route can only be applied to a network solely based on target-address-routing, if the IP package, during being delivered, passes through a certain apparatus supporting policy-based routing, the routing of a diagnosis-protocol-message is very likely to be different from that of a service stream being diagnosed, and then different diagnosis results will be obtained. A network system as shown in FIG. 3, Host A and Host B are personal computers, and Routers A-E are routers supporting policy-based routing. Host A can employ ping to check the route accessibility between Host A and Host B, and according to the existed ICMP technique, suppose the path of the message route routing is: Host A→Router A→Router B→Router C→Router E→Host B. If the TCP connection from Host A to Host B is policy-selected-routing to Router D at Router B, for example, a certain Access Control List (ACL), then the results of the above mentioned ping cannot truly show the accessibility of the TCP message from Host A to Host B, that is to say, there may exist a situation that Host A can communicate with Host B by ping, but the TCP message of Host A cannot reach Host B.

SUMMARY OF INVENTION

The present invention is initiated in view of said technical problems, and the object of the present invention is to provide a method for diagnosing the router which supports policy-based routing so as to solve the problem that the current network diagnosis tools cannot diagnose accurately the route of the network which includes a router supporting policy-based routing.

In order to achieve the above mentioned object, the present invention provides a method for diagnosing the router which supports policy-based routing, which is applied in the network including a router supporting policy-based routing, comprising:

adding stream description information of the service stream in the diagnosis-protocol-message, and containing a router warning option in the IP head of said diagnosis-protocol-message;

a router supporting policy-based routing receiving said diagnosis-protocol-message, routing according to said stream description information in said diagnosis-protocol-message;

said diagnosis-protocol-message is processed as standard diagnosis-protocol-message by a router which is independent of policy-based routing.

Preferably, said step of routing according to stream description information further comprises: analyzing the contents of the stream description information; matching the local policy of routing according to said contents, and routing according to the policy matched.

Preferably, said diagnosis-protocol-message is an echo message of ICMP, and the step of routing according to the stream description information further comprises the processing of the time to live value when it is timeout, that is, if the time to live value is timeout, return to the internet control message protocol timeout message.

Preferably, the step of adding the stream description information of the service stream in the diagnosis-protocol-message comprises: adding said stream description information in the protocol data unit of said diagnosis-protocol-message.

Preferably, said stream description information employs the coding format of "type-length-value".

Preferably, said stream description information comprises one of or the combination of protocol type, requirement of type of service, source address, source port, target address, target port, authentication information, and extensible sign of the service stream.

Preferably, if said network comprises a network address transformation apparatus, said network address transformation apparatus analyzes the received stream description information of said diagnosis-protocol-message, and then it further comprises: modifying the source address or source port of the stream description information to the source address and source port of said service stream after address transformation.

Preferably, if said network comprises a service classification apparatus, said service classification apparatus analyzes the stream description information of said diagnosis-protocol-message received, and then it further comprises: judging whether said stream description information comprises the requirement of type of service; if so, modifying a value of the requirement of type of service to a value of the requirement of type of service carried by the service stream after it passes through said service classification apparatus; if not, adding directly a value of the requirement of type of service carried by the service stream after it passes through said service classification apparatus into the stream description information.

Preferably, said method further comprises: limiting the amount of the message of the Internet control message protocol which enters a control layer.

Preferably, if a network edge router is configured with the passwords of ping/trace route of the internet control message protocol, after said network edge router receiving said diagnosis-protocol-message, the method further comprises: checking the protocol data unit of said diagnosis-protocol-message, if said protocol data unit not carrying said identification information, or if said identification information not matching said passwords of ping/trace, then abandoning said diagnosis-protocol-message.

Compared with the prior art, according to the method of the present invention, service stream description information, such as protocol type, transmission layer end pair, and requirement of type of service, is carried in the diagnosis-protocol-message, by employing said method of the present invention, the middle router supporting policy-based routing is able to transfer the message independent of IP head of the diagnosis-protocol-message, but selects routing according to said stream description information included in the message, thereby being capable of keeping the consistency between the diagnosis-protocol-message and routing of the service stream. Thus, the purpose of actual diagnosing routing or correctly diagnosing route is achieved.

BRIEF DESCRIPTION OF THE DRAWINGS

FIG. 1 is a schematic view of the protocol data unit format of ICMP stipulated by IETF protocol regulations of the prior art;

FIG. 2 is a schematic view of the PDU format of the ICMP echo message stipulated by IETF protocol regulations of the prior art;

FIG. 3 is a schematic view of a network supporting policy-based routing;

FIG. 6 is a schematic view of the data coding format in the TLVs field; and

FIG. 7 is a schematic view of the TLV coding format of the requirement of type of service (ToS) of the service stream.

DETAILED DESCRIPTION OF THE PREFERRED EMBODIMENT

It is believed that the above mentioned and other objects, characteristics and advantages of the present invention can be understood more clearly through the following detailed description of the preferred embodiments of the present application in combination with the drawings.

FIGS. 1-3 have been described in the portion of BACKGROUND ART, so there is no need to describe them again here.

Figure 4:
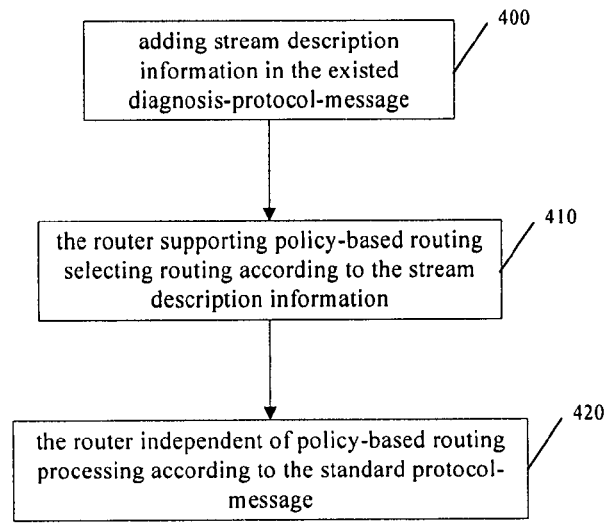
FIG. 4 is a flowchart of the method according to an embodiment of the present invention.

FIG. 4 shows a flowchart of the method for diagnosing the router which supports policy-based routing according to an embodiment of the present invention. In step 400, add stream description information in the existed diagnosis-protocol-message, and in the present embodiment, the diagnosis-protocol-message employs the ICMP echo message. Said step further comprises: defining some extensible options for the ICMP message and the PDU format of ICMP message which carries such extensible options, employing these extensible options to define the stream description information of the service stream, and then adding the stream description information in the PDU of the ICMP echo message and containing a router warning option in the IP head. Hereinafter, said step will be further described.

Figure 5:
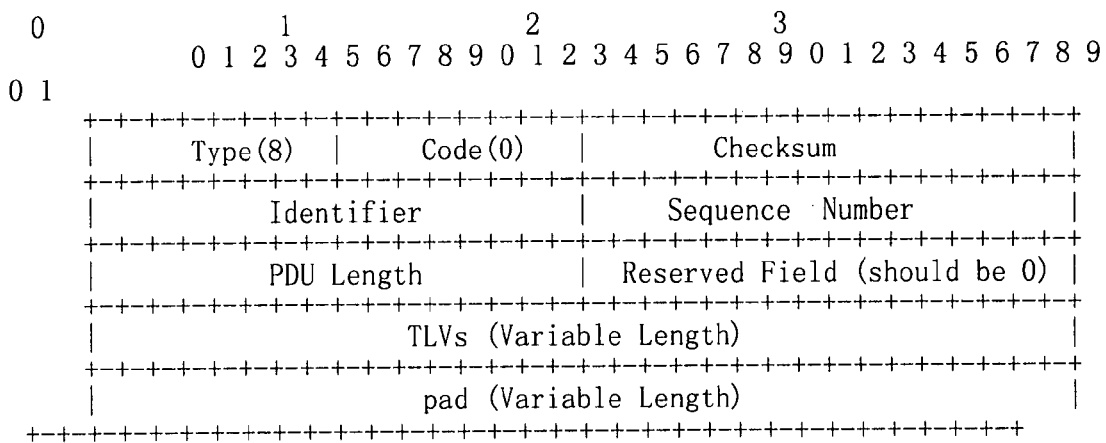
FIG. 5 is a schematic view of the PDU format of the ICMP echo message employed in the embodiment as shown in FIG. 4.

First of all, the present embodiment defines some extensible options for the ICMP message, and such extensible options are in the PDU of the ICMP message. FIG. 5 shows the format of the ICMP echo message which carries these extensible options. In PDU, besides the identifier and sequence number, the PDU length is also contained, and it is two 8 bits groups used for identifying the length of the part with coding format; reserved field, which is also two 8 bits groups, and must be zero when sending the ICMP message, and it can be neglected when receiving ICMP message; TLV refers to the extensible coding format of the ICMP extended, and its length is variable; PAD is filling field, and the extended ICMP message may carry several pad information of 8 bits group.

After defining the PDU format of the ICMP message carrying options, some stream description information may be in an extensible manner defined through the option field of the ICMP message. In the present embodiment, the stream description information employs the coding format of "type-length-value", and FIG. 6 is a schematic view of the TLV format. As shown in FIG. 6, the TLV format is a prolonged structure, and the first 8 bits group "Type" describes the type of the service stream description, the second 8 bits group "Length" describes the length of the parameter part of said service stream description, the last part "value" is the parameter of said service stream description, and its length is stipulated by Length and variable according to the Type. Values of Type in the service stream description defined by the present embodiment are given as below:

0×41: protocol type of the service stream;
0×42: requirement of type of service (TOS) of the service stream;
0×43: source address (IPv4) of the service stream;
0×44: source port of the service stream;
0×45: target address (IPv4) of the service stream;
0×46: target port of the service stream;
0×47: identification information;
0×48: extensible markup.

Taking the requirement of type of service of the service stream as an example, FIG. 7 provides its TLV coding format, wherein according to the above mentioned definitions, the value of Type is 0×42, the value of Length is 1, and the value of Value is the same as the definition of the corresponding field of the service stream that needs diagnosing. Accessibility of different service streams can be diagnosed through different setups of TLV of the ICMP message.

When stream description information is added in the ICMP echo message, an IP alert option must be carried, that is, containing a router warning option in the IP head, so as to inform the middle router that it should check and process said message more carefully. As for the ICMP echo message carrying stream description information, it no longer simply selects routing according to the information (such as the target address) in the IP head, but selects routing according to the stream description information of the ICMP echo message.

One point that should be clarified is that the middle router should support policy-based routing so as to identify and process the IP Alert option and at the same time select routing according to the stream description information. As for other routers independent of policy-based routing, they can conduct processing according to the standard protocol message, that is, according to the IETF protocol regulations of ICMP. In addition, the ICMP echo message may carry all or part of the stream description information; and parameter errors and ICMP message of other types may also select routing by carrying stream description information.

In step 410, the router supporting policy-based routing selects routing according to the stream description information in the message after receiving ICMP echo message carrying stream description information. Said step further comprises: after the router receives the ICMP echo message, if TTL is timeout, loopback an ICMP timeout notice according to IETE regulations; analyze the stream description information in the message and obtain the contents therein; then match the local routing policy (i.e. the policy route) according to said contents, and then the router selects routing according to the result of routing policy; and finally forward the ICMP message.

In step 420, after receiving the above mentioned ICMP echo message, the router independent of policy-based routing processes said message as standard ICMP echo message.

From the above mentioned description, it can be seen that by employing the present embodiment the middle router can select routing according to the stream description information, and the network which includes a router supporting policy-based routing can be supported by route diagnosis.

According to another embodiment of the present invention, if there is a network address transformation apparatus in the network, the source address of the service stream and the source port of a transmission layer will conduct transformation when the service stream from a private network goes to a public network through the NAT apparatus, hence, when the NAT apparatus receives from a private network the ICMP echo message which carries stream description information, if the stream description information includes the source address (IPv4) of the service stream and/or the source port of the service port (both coded in TLV format), the NAT apparatus also conducts corresponding transformation, and modifies the source address (IPv4) of the service stream and/or the value of the source port of the service stream to the source address and the source port of the service stream after the address transformation. And then match the routing policy of the NAT apparatus according to the contents in the stream description information, select routing according to the policy matched and send the service stream out.

According to still another embodiment of the present invention, if a network supports the type of service (TOS), a service classification apparatus is provided. After the service classification apparatus receives the ICMP echo message carrying stream description information, if the stream description information includes the requirement of TOS of the service stream (coded in TLV format), a value of the requirement of TOS is modified to a value of the requirement of TOS carried by the service stream after passing through the service classification device; and if the stream description information does not include the requirement of TOS of the service stream, add a value of the requirement of TOS (coded in TLV format) carried by the service stream after passing through the service classification apparatus in the stream description information. And then matching the routing policy of the NAT apparatus according to the contents in the stream description information, then selecting routing according to the policy matched and send the service stream out.

According to still another embodiment of the present invention, in order to avoid potential denial of service, the present method further comprises the step of limiting the stream of the ICMP message entering the control layer.

According to still another embodiment of the present invention, if the network edge router is configured with the passwords of ping/trace route of ICMP, after said network edge router receives ICMP echo message carrying the stream description information, its PDU is checked, and if the PDU is found not carrying identification information (coded in TLV format), or the value of said authentication information does not match the passwords ping/trace, then abandon said ICMP echo message.

The method of the present invention is described above in combination with the preferred embodiments of the present invention, while those skilled in the art should note that the above mentioned are just illustrative description rather than limitation on the present invention, and the equivalent alteration and modification that do not deviate from the concept of the present invention all belong to the scope of the present invention.

What is claimed is:

1. A computer implemented method for diagnosing a router which supports policy-based routing, which is applied in a network including a router supporting policy-based routing, and a router which is independent of the policy-based routing, the method comprising:

adding stream description information in an Internet control message protocol (ICMP) diagnosis-protocol-message and containing a router warning option which is used to inform the router supporting policy-based routing to check and process the ICMP diagnosis-protocol-message, in an Internet Protocol (IP) header of the ICMP diagnosis-protocol-message;

routing, by the router support policy-based routing, according to the stream description information in the ICMP diagnosis-protocol-message; and processing, by the router which is independent of the policy-based routing, the ICMP diagnosis-protocol-message according to ICMP;

wherein the stream description information employs the coding format of "type-length-parameter value," the steam description information comprises one or more of protocol type, requirement of type of service, source address, source port, target address, target port, authentication information, and extensible sign of the service stream;

the method further comprising, receiving, by a service classification entity in the router supporting policy-based routing, the ICMP diagnosis-protocol-message carrying the added stream description information;

analyzing, by a service classification entity in the router supporting policy-based routing, the stream description information of the ICMP diagnosis-protocol-message received;

determining, by a service classification entity in the router supporting policy-based routing, whether the stream description information comprises the requirement of type of service;

if the stream description information comprises the requirement of type of services, amending a value of the requirement of type of service of the stream description information into a value of the requirement of type of service carried by the service stream after it passes through the service classification entity; and if the stream description information does not comprise the requirement of type of service, adding, into the stream description information, a value of the requirement of type of service carried by the service stream after it passes through the service classification entity.

2. The method of claim 1 wherein the routing according to stream description information further comprises:

analyzing the contents of the stream description information;

matching a local routing policy at the router supporting policy-based routing according to the contents; and routing according to the policy matched.

3. The method of claim 2, wherein:

the ICMP diagnosis-protocol-message is an echo message of the ICMP; and the routing according to the stream description information further comprises:

processing a time to live value when it is timed out; and if the time to live value is timed out, returning an ICMP timeout message.

4. The method of claim 2 wherein adding the stream description information of service stream in the ICMP diagnosis-protocol-message comprises adding the stream description information in the protocol data unit of the ICMP diagnosis-protocol-message.

5. The method of claim 4, wherein:

if the router supporting policy-based routing is positioned at network edge and is configured with a password of ping/trace route of ICMP, then, after the router receives the ICMP diagnosis-protocol-message, the method further comprises:

checking, by the router, the protocol data unit of the ICMP diagnosis-protocol-message; and if the protocol data unit is not carrying the authentication information, or if the authentication information does not match the password of ping/trace route of ICMP, then abandoning the ICMP diagnosis-protocol-message.

6. The method of claim 1, further comprising, analyzing, by a network address transformation entity in the router supporting policy-based routing, the stream description information, which is received, of the ICMP diagnosis-protocol-message; and modifying a source address in the stream description information to a source address of the service stream which address translation has been performed for or modifying a source port in the stream description information to a source port of the service stream which address translation has been performed for.

7. The method of claim 1, further comprising limiting the amount of ICMP messages which enters a control layer.

* * * * *